US010645942B2

(12) United States Patent
Sheth et al.

(10) Patent No.: US 10,645,942 B2
(45) Date of Patent: May 12, 2020

(54) SYNERGISTIC FORMULATION INCLUDING AT LEAST ONE GIBBERELLIN COMPOUND AND SALICYCLIC ACID

(71) Applicant: Stoller Enterprises, Inc., Houston, TX (US)

(72) Inventors: Ritesh Bharat Sheth, Friendswood, TX (US); Veria Alvarado, Longwood, FL (US)

(73) Assignee: Stoller Enterprises, Inc., Houston, TX (US)

( * ) Notice: Subject to any disclaimer, the term of this patent is extended or adjusted under 35 U.S.C. 154(b) by 0 days.

(21) Appl. No.: 16/399,546

(22) Filed: Apr. 30, 2019

(65) Prior Publication Data
US 2019/0327987 A1 Oct. 31, 2019

Related U.S. Application Data

(60) Provisional application No. 62/664,867, filed on Apr. 30, 2018.

(51) Int. Cl.
*A23B 7/154* (2006.01)
*A23L 3/3544* (2006.01)
*A23L 3/3508* (2006.01)

(52) U.S. Cl.
CPC ............ *A23B 7/154* (2013.01); *A23L 3/3508* (2013.01); *A23L 3/3544* (2013.01)

(58) Field of Classification Search
CPC ...... A23B 7/154; A23L 3/3544; A23L 3/3508
See application file for complete search history.

(56) References Cited

U.S. PATENT DOCUMENTS

| | | |
|---|---|---|
| 4,851,035 A | 7/1989 | Pirrung |
| 5,055,126 A | 10/1991 | Dathe |
| 2006/0247130 A1 | 11/2006 | Van Der Kricken et al. |
| 2009/0170701 A1 | 7/2009 | Shinitzky et al. |
| 2015/0250173 A1 | 9/2015 | Korber et al. |
| 2015/0257383 A1 | 9/2015 | Deisenroth et al. |
| 2015/0313225 A1 | 11/2015 | Klaas et al. |
| 2015/0320048 A1 | 11/2015 | Rath et al. |
| 2015/0359214 A1 | 12/2015 | Sasson |
| 2017/0013836 A1* | 1/2017 | Sheth ................... A01N 43/12 |

FOREIGN PATENT DOCUMENTS

| | | |
|---|---|---|
| CN | 101692835 A | 4/2010 |
| CN | 101919441 A | 12/2010 |
| CN | 102028022 A | 4/2011 |
| CN | 102160572 A | 8/2011 |
| CN | 102948458 A | 3/2013 |
| CN | 103477883 A | 1/2014 |
| CN | 104082281 A | 10/2014 |
| CN | 104521600 A | 4/2015 |
| CN | 104642528 A | 5/2015 |
| CN | 104054706 B | 12/2015 |
| CN | 105494369 A | 4/2016 |
| CN | 105660642 A | 6/2016 |
| CN | 105724564 A | 7/2016 |
| CN | 105746499 A | 7/2016 |
| CN | 106070254 A | 11/2016 |
| CN | 106106710 A | 11/2016 |
| CN | 106912573 A | 7/2017 |
| CN | 107333872 A | 11/2017 |
| CN | 107586195 A | 1/2018 |
| IN | 21610/CHE/2012 A | 4/2016 |
| WO | 2014086854 A1 | 6/2014 |
| WO | 2015011615 A1 | 1/2015 |
| WO | 2015181035 A1 | 12/2015 |
| WO | 2016186526 A1 | 11/2016 |

OTHER PUBLICATIONS

Srivastava, M.K., Dwivedi, U.N. 2000. "Delayed ripening of banana fruit by salicylic acid." Plant Science. vol. 158, pp. 87-96.*
Archana, U., Sivachandiran, S. 2015. "Effect of Application of Gibberellic Acid (GA3) on Shelf-Life of Banana." International Journal of Research in Agriculture and Food Sciences. vol. 3, pp. 1-4.*
Vargas, A., Lopez, J.A. 2011. "Effect of Dose Rate, Application Method and Commercial Formulations of GA3 on Banana (Musa AAA) Fruit Green Life." Fresh Produce. vol. 5, pp. 51-55.*
Tao et al. CN 104054706. 2015. English (machine) Translation.*
D.T. Tabiyeh, Investigation of Glutathione, Salicylic acid and GA3 Effects on Browning of Pistacia vera Shoot Tips Culture, Proc. IVth IS on Pistachios and Almonds, Acta Hort. 726, ISHS 2006.
Syed Sabhi Ahmad, et al.; "Putrescine and Jasmonates Outplay Conventional Growth Regulators in Improving Postharvest Performance of *Iris germanica* L. Cut Scapes"; Proceedings of the National Academy of Sciences, India, Section B:Biological Sciences; vol. 88, issue 1, pp. 391-402 (2018).
Abdulaziz M.A. Alrashdi, et, al.; "Quality, antioxidant compounds, antioxidant capacity and enzymes activity of El-Bayadi' table grapes at harvest as affected by preharvest salicylic acid and gibberellic acid spray"; Scientia Horticulturae, vol. 220, pp. 243-249 (2017).
Homraj Sahare, et, al.; "Effect of Pulsing on Post Postharvest Life and Quality of Cut Anthurium Flowers Anthurium andraeanum L.) cv. Xavia"; Trends in Biosciences; vol. 8, issue 2, pp. 305-??? (2015).
Shipra Banerjee, et al.; "Effect of GA3 and carbendazim as preharvest and salicylic acid and 1-MCP as post-harvest treatment on storage and post-harvest life of mango cv Amrapali."; Environment and Ecology; vol. 34, 2A, pp. 683-685 (2016).
Zhen Zhu, et al.; "Effects of Postharvest Gibberellic Acid Treatment on Chilling Tolerance in Cold-Stored Tomato (*Solanum lycopersicum* L.) Fruit"; Food and Bioprocess Technology; vol. 9, pp. 1202-1209 (2016).

(Continued)

*Primary Examiner* — Nikki H. Dees (74) *Attorney, Agent, or Firm* — Yancy IP Law, PLLC (57) ABSTRACT

A synergistic formulation comprising at least one gibberellin (GA) compound and salicylic acid (SA) for delaying fruit ripening and maintaining good quality of fruit under storage.

17 Claims, 7 Drawing Sheets

(56) References Cited

OTHER PUBLICATIONS

Ruqiya Majeed, et al.; "Enzymatic changes in plum (*Prunus salicina* Lindl.) subjected to some chemical treatments and cold storage."; Journal of Food Science and Technology; vol. 53, issue 5, pp. 2372-2379 (2016).

D. Mandal, et al.; "Effect of Post-harvest Treatments on Quality and Shelf Life of Pineapple (*Ananas comosus*[L.] Merr. 'Giant Kew') Fruits at Ambient Storage Condition"; International Journal of Bio-resource and Stress Management; vol. 6, issue 4, pp. 490-496 (2015).

Chengcheng Gang, et al.; "Synergistic Effect of Chemical Treatments on Storage Quality and Chilling Injury of Honey Peaches"; Journal of Food Processing and Preservation; vol. 39, pp. 1108-1117 (2015).

Saleh A. Mohamed, et al.; "Antioxidant activity, antioxidant compounds, antioxidant and hydrolytic enzymes activities of 'Barhee' dates at harvest and during storage as affected by pre-harvest spray of some growth regulators"; Scientia Horticulturae; vol. 167, pp. 91-99 (2014).

M.N. Tourky, et aL; "Physiological studies on the marketability of williams banana fruits"; American Journal of Plant Physiology; vol. 9, issue 1, pp. 1-15 (2014).

Yasar Sajjad, et al.; "Response of morphological and physiological growth attributes to foliar application of plant growth regulators in gladiolus White Prosperity"; Pakistan Journal of Agricultural Sciences; vol. 51, issue 1, pp. 123-129 (2014).

Khalid Mahmood Qureshi, et al.; "Impact of exogenous application of salt and growth regulators on growth and yield of strawberry"; Pakistan Journal of Botany; vol. 45, issue 4, pp. 1179-1185 (2013).

Guillermo M. Carrillo-Castaneda, et al.; "Postharvest seed treatments to improve the papaya seed germination and seedlings development"; Tropical and Subtropical Agroecosystems; vol. 16, pp. 133-141 (2013).

S. Muthu Kumar, et al.; "Effect of plant growth regulators on growth, yield and exportable quality of cut roses"; The Bioscan; vol. 7, issue 4, pp. 733-738 (2012).

R.S. Al-Obeed; "Jujube post-harvest fruit quality and storagability in response to agro-chemicals preharvest application"; African Journal of Agricultural Research; vol. 7, Issue 36, pp. 5099-5107 (2012).

Hare Krishna, et al.; "Interaction between different pre- and post-harvest treatments on shelf life extension of Oregon Spur apple"; Fruits; vol. 67, issue 1, pp. 31-40 (2012).

H.A. Kassem, et al.; "Improving yield, quality and profitability of Flame seedless grapevine grown under aird Environmental by growth regulators preharvest applications"; Middle East Journal of Scientific Research; vol. 8, issue 1, pp. 165-172 (2011).

R.S. Al-Obeed, et al.; "Enhancing the shelf life and storage ability of Flame seedless grapevine by agrochemicals preharvest foliar applications"; Middle East Journal of Scientific Research; vol. 8, issue 2, pp. 319-327 (2011).

H.A. Kassem, et al.; "Productivity, fruit quality and profitability of jujube trees improvement by preharvest application of agrochemicals"; Middle East Journal of Scientific Research; vol. 9. issue 5, pp. 628-637 (2011).

H.A. Marzouk, et al.; "Improving yield, quality, and shelf life of Thompson seedless grapevine by preharvest foliar applications"; Scientia Horticulturae; vol. 130, pp. 425-430 (2011).

M. Gholami, et al.; Effect of Pre- and Postharvest Treatments of Salicylic and Gibberellic Acid on Ripening and Some Physicochemical Properties of 'Mashhad' Sweet Cherry (*Prunus avium* L) Fruit; Acta Horticulturae; vol. 884, pp. 257-264 (2010).

Nirupama Pila, et al.; "Effect of post harvest treatments on physicochemical characteristics and shelf life of tomato (*Lycopersicon esculentum* Mill.) fruits during storage"; American-Eurasian Journal of Agricultural Environmental Sciences; vol. 9, issue 5, pp. 470-479 (2010).

S. Lurie; "Plant growth regulators for improving postharvest stone fruit quality"; Acta Horticulturae; vol. 884, pp. 189-198 (2010).

D. Hashemabadi, et al.; "Yield and quality management of rose (*Rosa hybrida* cv, Poison) Plant with plantgrowth regulators"; Plant Omics Journal; vol. 3, issue 6, pp. 167-171 (2010).

D.T Tabiyeh, et al.; "Investigation of glutathione, salicylic acid and GA3 effects on browning in Pistacia vera shoot tips culture"; Acta Horticulturae; vol. 726, pp. 201-203.

Ben-Aire et al., "Ethylene Production by Growing and Senescing Pear Fruit Cell Suspensions in Response to Gibberellin," Plant Physiol. 1991, vol. 95, pp. 943-947, abstract.

Leslie et al., "Inhibition of Ethylene Biosynthesis by Salicyclic Acid," Plant Physiol. 1988, vol. 88, pp. 833-837.

* cited by examiner

SYNERGISTIC FORMULATION INCLUDING AT LEAST ONE GIBBERELLIN COMPOUND AND SALICYCLIC ACID

CROSS-REFERENCE TO RELATED APPLICATIONS

This application claims the benefit, under 35 U.S.C. 119(e), of U.S. Provisional Application No. 62/664,867 filed Apr. 30, 2018, the contents of which are incorporated herein by reference.

BACKGROUND OF THE INVENTION

Field of the Invention

The present invention is a synergistic formulation including at least one gibberellin compound and salicyclic acid. This synergistic formulation delays fruit ripening and maintains good quality of fruit under storage. Additional beneficial fruit quality parameters achieved by using the synergistic formulation include fruit firmness, color and decrease in postharvest diseases.

Description of Related Art

Harvested fruits are classified as climacteric and non-climacteric based on their rate of respiration, which is proportional to the rate of fruit decay. Respiration is the process that provides energy to all organisms. Respiration consists of the degradation of stored organic materials such as proteins, fats and carbohydrates into simple end products with a release of energy. Oxygen is consumed in the process and carbon dioxide $CO_2$ is produced.

Examples of climacteric fruits include, but are not limited to, apple, apricot, avocado, bananas, biriba, blueberry, breadfruit, cherimoya, durian, fijoa, fig, guava, jackfruit, kiwifruit, mango, mangosteen, muskmelon, nectarine, papaya, passion fruit, peach, pear, persimmon, plantain, plum, quince, rambutan, sapodilla, sapote, soursop, sweetsop, and tomato.

Examples of non-climacteric fruits include, but are not limited to, blackberry, cacao, carambola, cashew apple, cherry, cranberry, cucumber, date, eggplant, grape, grapefruit, jujube, lemon, lime, longan, loquat, lychee, okra, olive, orange, pea, pepper, pineapple, pomegranate, prickly pear, raspberry, strawberry, summer squash, tamarillo, tangerine and mandarine and watermelon.

From the group of climacteric fruits, banana is the $2^{nd}$ largest fruit crop in the world and are cultivated in more than 120 countries in tropical and subtropical areas. The main regions of the world that export bananas are Latin America, the Caribbean, Asia, and Africa, and the major importers of bananas are the European Union and United States. Bananas need to be harvested at physiological maturity and then shipped overseas for 30 to 40 days under low temperatures (13.2° C./52° F.) to reduce their metabolism, ethylene production, and the ripening process. Sometimes bananas are placed in modified or controlled atmosphere rooms with ethylene absorbers such as potassium permanganate to inhibit ethylene production.

Gibberellic acid ($GA_3$) is a plant growth regulator commonly used to ensure that bananas remain un-ripened during shipment. $GA_3$ has been shown to delay loss in fruit firmness and vitamin C content, and delay fruit ripening, senescence and retard peel chlorophyll degradation in jujube. It has also been tested in mangoes and delays loss in total weight, chlorophyll, and ascorbic acid content and reduces amylase and peroxidase activity. $GA_3$ can initiate re-greening in citrus fruits and delays the appearance of red color in tomatoes. Moreover, $GA_3$ applied exogenously on banana slices does not alter respiration rate or ethylene profile, but postpones by 2 days the accumulation of sucrose. While $GA_3$ allows bananas to stay unripe, in some cases it causes them to soften, which is undesirable to consumers.

Salicylic acid (SA), a plant phenolic compound and a plant defense hormone, has also been shown to slow down banana ripening. Bananas treated with SA at either 0.5 mM or 1 mM had firmer fruits, lower sugar content, and a decrease in respiration rates. Salicylic acid inhibitory effects on ethylene biosynthesis have been known since the late 80's in carrot and pear cell suspension culture studies where the use of SA reduced ethylene production and allowed proliferation of the cell culture. Acetyl salicylic acid has been shown to inhibit ethylene production in apples. It has also been proven that SA inhibits cell wall and membrane degrading enzymes (polygalacturonase, lipoxygenase, cellulose and pectin methylesterase) and as a result of this inhibition, banana fruits treated with SA are firmer.

Later studies on tomato fruit ripening have evaluated the use of either $GA_3$, salicylic acid, or calcium chloride (for its role on cell wall rigidity) in slowing ripening. Of all treatments tested, $GA_3$ at 0.1%, $CaCl_2$ at 1.5% or SA at 0.4 mM extended the shelf life of tomatoes. Similar studies conducted in Cavendish bananas tested varying concentrations of either GA or SA and determined that 300 ppm $GA_3$ or 4 mM SA caused a more considerable delay in ripening than other treatments.

BRIEF SUMMARY OF THE INVENTION

A synergistic formulation comprising at least one gibberellin compound (GA) and salicylic acid (SA) reduces the production of ethylene while maintaining the firmness and color of an agricultural product, which allows for a longer shelf life.

BRIEF DESCRIPTION OF THE DRAWING(S)

The features and advantages of the present invention will become apparent from the following detailed description of a preferred embodiment thereof, taken in conjunction with the accompanying drawings, in which.

DETAILED DESCRIPTION OF THE INVENTION

The synergistic formulation comprises, optionally consists essentially of, or optionally consists of, at least one gibberellin (GA) compound; salicylic acid (SA); optionally at least one solvent; optionally at least one additional component that does not affect the ethylene production of the present synergistic formulation, optionally at least one non-ionic or anionic surfactants; and optionally at least one customary adjuvants, wherein said synergistic formulation reducing ethylene production in agricultural products, and preferably reduces color change of the agricultural product. In one embodiment, the synergistic formulation comprises, optionally consisting essentially of, or optionally consisting of, at least one gibberellin compound and salicylic acid as the only active agents that assist in reducing ethylene production in agricultural products. In another embodiment, the synergistic formulation comprises, optionally consisting essentially of, or optionally consisting of, at least one gibberellin compound and salicylic acid as the only active agents that trigger a positive physiological response in agricultural products. In another embodiment, the synergistic formulation comprises, optionally consists essentially of, or optionally consists of, at least one gibberellin (GA) compound and salicylic acid (SA) without the addition of any halogenated compound, such as chlorinated compounds, for example $CaCl_2$.

"Active agents" are generally understood to include those compounds that assist in reducing ethylene production in agricultural products. Additionally, "active agents" are any compounds that trigger a positive physiological response in agricultural products.

Salicylic acid is general known to have the following chemical structure:

Gibberellin compounds are generally understood to be tetracyclic diterpene acids. In one embodiment of the present invention, the at least one gibberellin compound is selected from the group consisting of gibberellic acid ("$GA_3$"), gibberellin$_4$ ("$GA_4$"), gibberellin$_{4/7}$ ("$GA_{4/7}$") and combinations thereof. In a preferred embodiment of the present invention, the at least one gibberellin compound is gibberellic acid ($GA_3$) having the following structure:

In one embodiment of the present invention, the synergistic formulation includes GA:SA in a ratio of 20:1 to 1:1, or 10:1 to 1:1, 5:1 to 2:1, or 3:1 to 2:1. In one embodiment, the synergistic formulation includes at least one solvent with 20-2000 ppm GA, or 100-1800 ppm GA, or 200-1500 ppm GA, or 500-1500 ppm GA; and 20-2000 ppm salicylic acid (SA), or 50-1000 ppm SA, or 50-800 ppm SA. In another embodiment, the synergistic formulation includes at least one solvent with 625-1250 ppm GA and 62.5-625 ppm SA.

In one embodiment of the present invention, the synergistic formulation comprises, optionally consists essentially of, or optionally consists of, up to 20 wt. % at least one gibberellin (GA) compound based on the total weight of the formulation; up to at least 25 wt. % salicylic acid (SA) based on the total weight of the formulation; optionally at least 50 wt. % at least one solvent, preferably propylene glycol and/or PEG, based on the total weight of the formulation; optionally at least one additional component that does not affect the ethylene production of the present synergistic formulation, optionally at least one non-ionic or anionic surfactants; and optionally at least one customary adjuvants, wherein said synergistic formulation reducing ethylene production in agricultural products.

In alternate embodiments, the synergistic formulation includes 5-20 wt. % at least one gibberellin compound, or optionally 10-20 wt. % at least one gibberellin compound, or optionally 10-15 wt. % at least one gibberellin compound, or optionally 10-12 wt. % at least one gibberellin compound based on the total weight of the formulation. In alternate embodiments, the synergistic formulation may include the previously listed amounts of GA compound and 0.5-25 wt. % salicylic acid, or optionally 4-25 wt. % salicylic acid, or optionally 4-20 wt. % salicyclic acid, or optionally 4-10 wt. % salicyclic acid, or optionally 4-5 wt. % salicyclic acid based on the total weight of the formulation.

In one embodiment, the synergistic formulation comprises, optionally consists essentially of, or optionally consists of, 18-20 wt. % of at least one gibberellin (GA) compound based on the total weight of the formulation; 20-25 wt. % salicylic acid (SA) based on the total weight of the formulation; 50-62 wt. % at least one solvent, preferably propylene glycol and/or PEG, based on the total weight of the formulation; optionally at least one additional component that does not affect the ethylene production of the present synergistic formulation, optionally at least one non-ionic or anionic surfactants; and optionally at least one customary adjuvants, wherein said synergistic formulation reducing ethylene production in agricultural products.

In one embodiment, the synergistic formulation comprises, optionally consists essentially of, or optionally consists of, 8-10 wt. % of at least one gibberellin (GA) compound based on the total weight of the formulation; 8-10 wt. % salicylic acid (SA) based on the total weight of the formulation; 75-84 wt % at least one solvent, preferably propylene glycol and/or PEG, based on the total weight of the formulation; optionally at least one additional component that does not affect the ethylene production of the present synergistic formulation, optionally at least one non-ionic or anionic surfactants; and optionally at least one customary adjuvants, wherein said synergistic formulation reducing ethylene production in agricultural products.

In one embodiment, the synergistic formulation comprises, optionally consists essentially of, or optionally consists of, 18-20 wt. % of at least one gibberellin (GA) compound based on the total weight of the formulation; 0.5-1 wt. % salicylic acid (SA) based on the total weight of the formulation; 75-81.5 wt. % at least one solvent, preferably propylene glycol and/or PEG, based on the total weight of the formulation; optionally at least one additional component that does not affect the ethylene production of the present synergistic formulation, optionally at least one non-ionic or anionic surfactants; and optionally at least one customary adjuvants, wherein said synergistic formulation reducing ethylene production in agricultural products.

In one embodiment, the synergistic formulation comprises, optionally consists essentially of, or optionally consists of, about 12 wt. % of at least one gibberellin (GA) compound based on the total weight of the formulation; about 4.5 wt. % salicylic acid (SA) based on the total weight of the formulation; 80-83.5 wt. % at least one solvent, preferably propylene glycol and/or PEG, based on the total weight of the formulation; optionally at least one additional component that does not affect the ethylene production of the present synergistic formulation, optionally at least one non-ionic or anionic surfactants; and optionally at least one customary adjuvants, wherein said synergistic formulation reducing ethylene production in agricultural products.

In one embodiment of the present invention, the synergistic solution is provided as a non-aqueous solution. As provided herein, it is understood that the term "non-aqueous" may include small amounts of water, preferably less than 5 wt. %, preferably less than 4 wt. %, preferably less than 3 wt. %, preferably less than 2 wt. %, preferably less than 1 wt. %, and preferably less than 0.5 wt. % based on the total weight of the synergistic formulation. However, it is preferred that water is not intentionally added to the present synergistic formulation.

The synergistic formulation of the present invention preferably includes at least one solvent such that the total amount of solvents present is ≥50 wt. %, ≥60 wt. %, ≥70 wt. %, ≥80 wt. %, or ≥85 wt. %, or ≥90 wt. %, or ≥95 wt. %, or ≥99 wt. % based on the total weight of the synergistic formulation.

In one embodiment of the present invention, the synergistic formulation includes the above-identified amounts of SA and GA and at least one solvent selected from a wide variety of organic solvents. Such solvents include, but are not limited to, ethanol, n-propanol, iso-propanol, ethyl lactate, 3-hydroxybutyrate (ethyl and propyl esters), polymeric and non-polymeric glycols, glycerols, polyethylene glycol, polypropylene glycol, propylene carbonate and combinations thereof. In one embodiment, propylene glycol is used as the solvent in the synergistic formulation of the present invention. Preferably, the synergistic formulation includes the above-identified amounts of SA and GA and ≥50 wt. % propylene glycol, or ≥60 wt. % propylene glycol, or ≥70 wt. % propylene glycol, ≥80 wt. % propylene glycol, or ≥85 wt. % propylene glycol, or ≥90 wt. % propylene glycol, or ≥95 wt. % propylene glycol, or ≥99 wt. % propylene glycol based on the total weight of the synergistic formulation. In another embodiment, at least one polyethylene glycol (PEG) with a molecular weight from 190-420 is used as the solvent in the synergistic formulation of the present invention. Preferably, the synergistic formulation includes the above-identified amounts of SA and GA and ≥50 wt. % polyethylene glycol, or ≥60 wt. % polyethylene glycol, or ≥70 wt. % polyethylene glycol≥80 wt. % polyethylene glycol, or ≥85 wt. % polyethylene glycol, or ≥90 wt. % polyethylene glycol, or ≥95 wt. % polyethylene glycol, or ≥99 wt. % polyethylene glycol based on the total weight of the synergistic formulation. Preferably, the synergistic formulation includes the above-identified amounts of SA and GA and ≥50 wt. % of a combination of solvents, such as polyethylene glycol and propylene glycol, or ≥60 wt. % of a combination of solvents, such as polyethylene glycol and propylene glycol, or ≥70 wt. % of a combination of solvents, such as polyethylene glycol and propylene glycol, ≥80 wt. % of a combination of solvents, such as polyethylene glycol and propylene glycol, or ≥85 wt. % of a combination of solvents, such as polyethylene glycol and propylene glycol, or ≥90 wt. % of a combination of solvents, such as polyethylene glycol and propylene glycol, or ≥95 wt. % of a combination of solvents, such as polyethylene glycol and propylene glycol, or ≥99 wt. % of a combination of solvents, such as polyethylene glycol and propylene glycol based on the total weight of the synergistic formulation.

In one embodiment of the present invention, the synergistic formulation includes polar and semi-polar organic solvent is a single or combination of "non-volatile, polar or semi-polar organic solvents", herein defined to exclude those volatile organic compounds (VOCs) with a vapor pressure less than 0.1 mm Hg at 20° C. A polar solvent is defined as that which dissolves ionic and other polar solutes. Semi-polar solvents induce a certain degree of polarity in non-polar molecules. A measurement of polarity may be determined by its dielectric constant. Semi- and polar solvents defined in this invention are those solvents that have dielectric constants greater than 10 @ 20° C. For example, the synergistic formulation may include, but is not limited to the following solvents: alcohols, dialkyl ketones, alkylene carbonates, alkyl esters, pyrrolidones, aryl esters, and combinations thereof.

The synergistic formulation may also include non-ionic or anionic surfactants including, but not limited to the group consisting of carboxylates, sulfonates, natural oils, alkylamides, arylamides, alkylphenols, arylphenols, ethoxylated alcohols, polyoxygethylene, carboxylic esters, polyalkylglycol esters, anhydrosorbitols, glycol esters, carboxylic amides, monoalkanolamine, poloxyethylene fatty acid amides, polysorbates, cyclodextrins, sugar based, silicone based, polyalkylated alcohols, alkylaryl ethoxylates, and combinations thereof. In one embodiment, the synergistic formulation includes the above-identified amounts of SA and GA and optional solvents and a total amount of surfactants of ≤10 wt. %, or ≤5 wt. %, or ≤1 wt. % based on the total weight of the synergistic formulation.

The synergistic formulation may include the above-identified amounts of GA compound, SA, optional solvents, optional surfactants and optional additional components such that the total amounts of all such additional components is preferably less than 10 wt. %, or less than 5 wt. %, or less than 1 wt. % based on the total weight of the synergistic formulation. Preferably, such components do not affect the ethylene production of the present synergistic formulation. These additional components include surface active agents, crystal growth inhibitors, fungicides, stickers, spreaders, leaf penetrants, dispersants, systemic acquired resistance inducers, systemic acquired resistance inhibitors, anti-foaming agents, preservatives, pH regulators, cosolvents, humectants, dyes, UV protectants, vehicles, sequestrants, and combinations thereof, or other components which do not affect the ethylene production of the present synergistic formulation.

In one embodiment of the present invention, the synergistic formulation is prepared by combining the above-identified amounts of GA compound, SA, optional solvents, optional surfactants and optional additional components with optional customary adjuvants. In one embodiment of the present invention the total amounts of all such customary adjuvants is preferably less than 10 wt. %, or less than 5 wt. %, or less than 1 wt. % based on the total weight of the synergistic formulation.

The synergistic formulation may be provided in the form of solutions, emulsions, suspensions, pastes, powders or granulates. In a preferred embodiment, the synergistic formulation is a solution, most preferably a non-aqueous solution.

The active agents are used in the form of their formulations or the forms of application prepared therefrom or their mixtures with further components in customary manner, e.g. by means of pouring, splashing, spraying or dusting. Suitable forms of application are, for example, aqueous or non-aqueous solutions, which are stabilized with customary dispersing agents, suspensions, emulsions, spray agents or dusting agents. Other forms of application involved the immersion of commodity or agricultural product into a solution containing the active agents. Application could be done pre-harvest and post-harvest.

The synergistic formulation of the present invention may be used on any agricultural product, for example, on: bananas, apples, mangoes, avocados, artichokes, blueberries, carrots, celery, cherries, citrus, collard greens, broccoli, cucumbers, corn, grapes, melons, pecans, peppers, pineapples, rice, rhubarb, spinach, stone fruits, strawberries, watercress and other plants in need of treatment. In one preferred embodiment, the synergistic formulation is used on bananas to reduce ethylene production while maintaining firmness to yield a fruit with a longer shelf life.

It should be understood that the recitation of a range of values includes all of the specific values in between the highest and lowest value. For example, the recitation of "20-2000 ppm" includes all of the values between 20 to 2000 such that either the upper or lower limits may include, but are not limited to 30, 30, 40, 50, 60, 70, 80, 90, 100, 200, 300, 400, 500, 600, 700, 800, 900, 1000, 1100, 1200, 1300, 1400, 1500, 1600, 1700, 1800, and 1900 ppm. For example, the recitation of "10:1 to 1:1" includes all of the values between 10:1 to 1:1 such that either the upper or lower limits may include, but are not limited to, 9:1, 8:1, 7:1, 6:1, 5:1, 4:1, 3:1, 2:1 to 1:1. For example, the recitation of "up to 20 wt. %" includes all of the values between 0.001-20 such that either the upper or lower limits may include, but are not limited to 0.001, 0.01, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, and 20. For example the recitation of "up to at least 25 wt. %" includes all of the values between 0.001-25 such that either the upper or lower limits may include, but are not limited to 0.001, 0.01, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24 and 25. For example, the recitation of "at least 50 wt. %" includes all of the values between 50-100 such that either the upper or lower limits may include, but are not limited to 50, 51, 52, 53, 54, 55, 56, 57, 58, 59, 60, 61, 62, 63, 64. 65, 66, 67, 68, 69 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100.

As used herein, all numerical values relating to amounts, weight percentages and the like are defined as "about" or "approximately" each particular value, namely, plus or minus 10% (+−10%). For example, the phrase "at least 5% by weight" is to be understood as "at least 4.5% to 5.5% by weight." Therefore, amounts within 10% of the claimed values are encompassed by the scope of the claims. The percentages of the components in the formulations are listed by weight percentage based on the total weight of the formulation, unless stated otherwise.

A basic and novel characteristic of the present invention is that the synergistic formulation comprises, optionally consists essentially or, or optional consists of, at least one gibberellin compound (GA) and salicylic acid (SA), optionally in solution, that reduces the production of ethylene while maintaining the firmness and color of an agricultural product, which allows for a longer shelf life.

The following example illustrates one embodiment of the present invention. Those of skill in the art would understand how to modify the example to arrive at the present invention.

Example 1

The active agents gibberellic acid ($GA_3$) and salicylic acid (SA) were tested separately and mixed together (GA+SA synergistic formulation) to determine their effects on Thailand banana shelf life. Ethylene emission and fruit hardness/fruit firmness were the parameters measured in this test.

The active agents were tested at full rate when used alone and at half rate when combined in the synergistic formulation. Initial experiments, not reported here, were done to determine the best dose combination of active agents.

Treatments consisted of a Control-water treatment, SA 552 ppm (4 mM) in propylene glycol, $GA_3$ 1500 ppm in propylene glycol, and $GA_3$ 750 ppm (12 wt. %)+SA 276 ppm (4.5 wt. %) (2 mM) in propylene glycol. These formulations including the active agents were dissolved in water and then 5 ml were sprayed over each banana. The bananas were air dried for 25 minutes and then placed in transparent closed boxes at 75° F. for up to 10 days.

Ethylene was measured with a Portable Ethylene Analyzer F-900, Felix Instruments. The fruits were placed for 40-60 minutes in sealed containers adapted with septum stoppers and then a syringe was used to sample the air in the headspace. Ethylene was determined in ppm/g/min units. The fruit hardness/fruit firmness was measured in Newtons (force units) for a 4 mm depth with a Texture analyzer CT-3, 4500 g, BrookField Ametek with a TA10 probe.

FIGS. 1-4 show the test results indicating that ethylene emission was the lowest when the synergistic formulation was applied to the bananas. And accordingly, the fruit firmness at 10 DAT was the highest when the bananas were treated with the synergistic formulation. This demonstrates that the synergistic formulation has a stronger effect on fruit ripening and extending banana shelf life than the individual active agent's formulations.

A statistical analysis of the data confirms that the synergistic formulation provides significant results as follows:

TABLE 1

7 Day Firmness

|  | SA 552 | GA$_3$ 1500 | GA$_3$ 750 + SA 276 |
|---|---|---|---|
| P value vs control | 0.17602 | 0.68073 | 0.73437 |
| P value vs SA 552 |  | 0.1225 | 0.39234 |
| P value vs GA 1500 |  |  | 0.49524 |

TABLE 2

10 Day Firmness

|  | SA 552 | GA$_3$ 1500 | GA$_3$ 750 + SA 276 |
|---|---|---|---|
| P value vs control | 0.76078 | 0.70965 | 0.09455 |
| P value vs SA 552 |  | 0.46565 | 0.14888 |
| P value vs GA 1500 |  |  | 0.01981 |

TABLE 3

7 Day Ethylene Study

|  | SA 552 | GA$_3$ 1500 | GA$_3$ 750 + SA 276 |
|---|---|---|---|
| P value vs control | 0.98635 | 0.05908 | 0.0013706 |
| P value vs SA 552 |  | 0.05558 | 0.001017097 |
| P value vs GA 1500 |  |  | 0.000347125 |

TABLE 4

10 Day Ethylene Study

|  | SA 552 | GA$_3$ 1500 | GA$_3$ 750 + SA 276 |
|---|---|---|---|
| P value vs control | 0.29322 | 0.63964 | 0.00648 |
| P value vs SA 552 |  | 0.04572 | 8.8E-05 |
| P value vs GA 1500 |  |  | 7.9E-05 |

Example 2

The active agents Gibberellic acid (GA$_3$) and Salicylic acid (SA) were tested separately and mixed together (GA+SA synergistic formulation) to determine their effects on Cavendish banana (most popular commercial banana) shelf life. Ethylene emission, fruit hardness/fruit firmness and color were the parameters measured in this test.

The active agents were tested at full rate when used alone and at different ratios (GA:SA) when combined in the synergistic formulation: ~20:1, ~10:1, ~5:1, ~2.7:1 and ~1:1.

Treatments consisted of a Control-water treatment, SA 1500 ppm in propylene glycol, GA$_3$ 1500 ppm in propylene glycol, and GA$_3$ 1250 ppm (18.2 wt. %)+SA 62.5 ppm (0.9 wt. %) (~20:1) in propylene glycol, GA$_3$ 1250 ppm (18.2 wt. %)+SA 125 ppm (1.8 wt. %) (~10:1) in propylene glycol, GA$_3$ 1250 ppm (16.7 wt. %)+SA 250 ppm (3.3 wt. %) (~5:1) in propylene glycol, GA$_3$ 750 ppm (12 wt. %)+SA 276 ppm (4.5 wt. %) (~2.7:1) in propylene glycol and GA$_3$ 625 ppm (5 wt. %)+SA 625 ppm (5 wt. %) (~1:1) in propylene glycol. The formulations including the active agents were dissolved in water and mixed with thiabendazole and imidazole (300 ppm each), fungicides used commercially in bananas. Sprays were directed to the crown. The bananas were air dried and then packed in commercial cardboard boxes using an internal plastic liner with 4 holes at the bottom. Packaged fruit was stored in a cold room at 13.5° C. for transport simulation of 21 days. After transport simulation, the fruit was transferred to a ripening room at 18° C. for 24 hours and then ethylene at 100-150 ppm was applied for 24 hours using a continuous discharge catalytic generator (American ripener arco 1200).

Ethylene was measured with a gas chromatograph, (Agilent 7920 FID/TCD). The fruits (950-1500 grams) were placed for 2 hours in sealed containers (2.5 gallons) adapted with septum stoppers and then a syringe was used to sample the air in the headspace. Ethylene was determined in uL/Kg·h units. The fruit hardness/fruit firmness was measured in Newtons (force units) with a Chatillon DPPH100, conical probe of 5 mm for a fixed depth of 0.5 inch. Peel color was measured with an iWAVE WR10 Colorimeter, which is similar to the CR300 Chroma meter Minolta. Hue values were calculated based on the a, b and L values read by the device.

Figure 1:
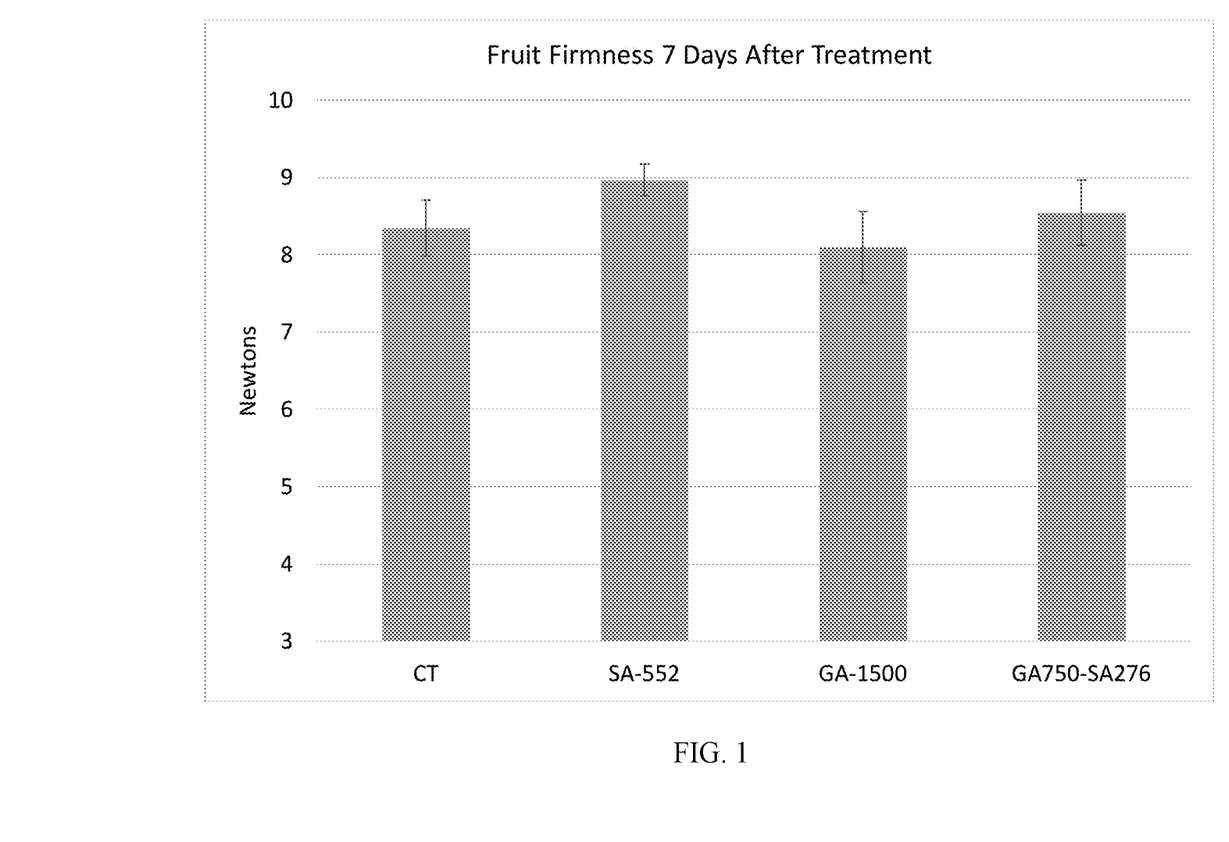
FIG. 1 is a graph showing the fruit firmness at 7 days after treatment with a control (CT), salicylic acid (SA) alone, gibberellic acid (GA) alone, and the GA+SA synergistic formulation of the present invention.
Figure 2:
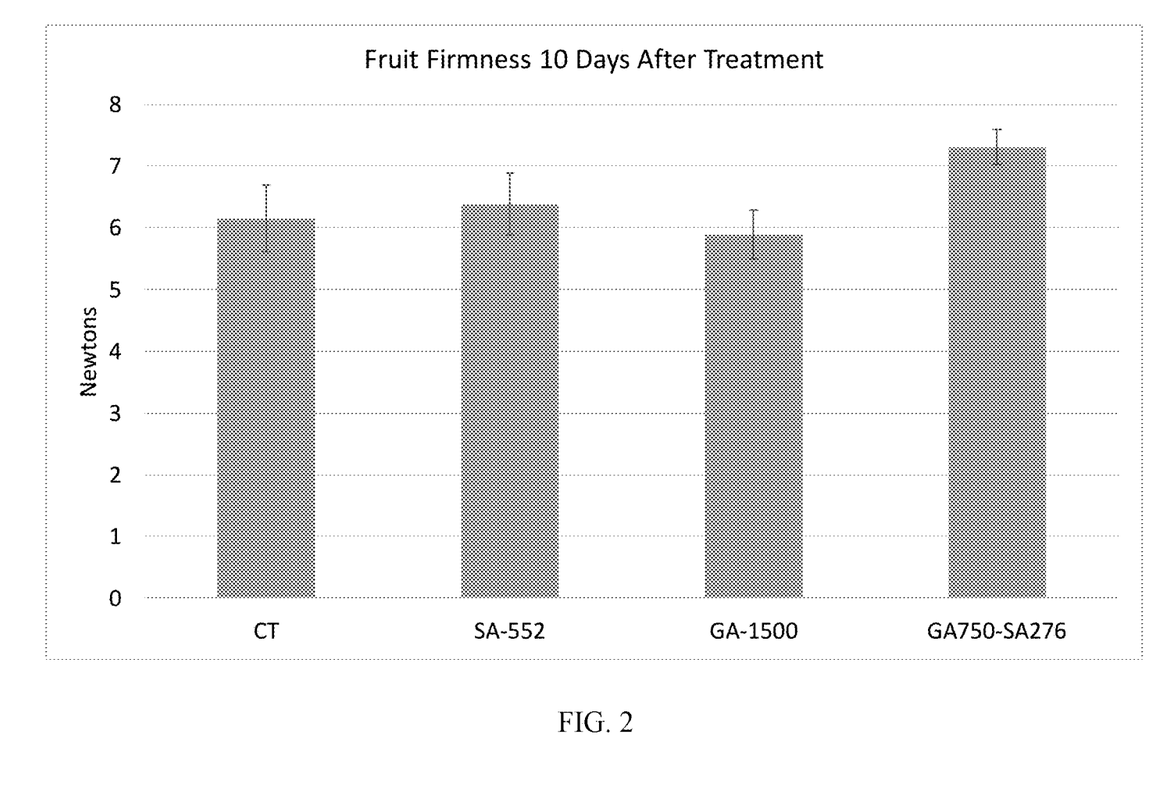
FIG. 2 is a graph showing the fruit firmness at 10 days after treatment with a control (CT), salicylic acid (SA) alone, gibberellic acid (GA) alone, and the GA+SA synergistic formulation of the present invention.
Figure 3:
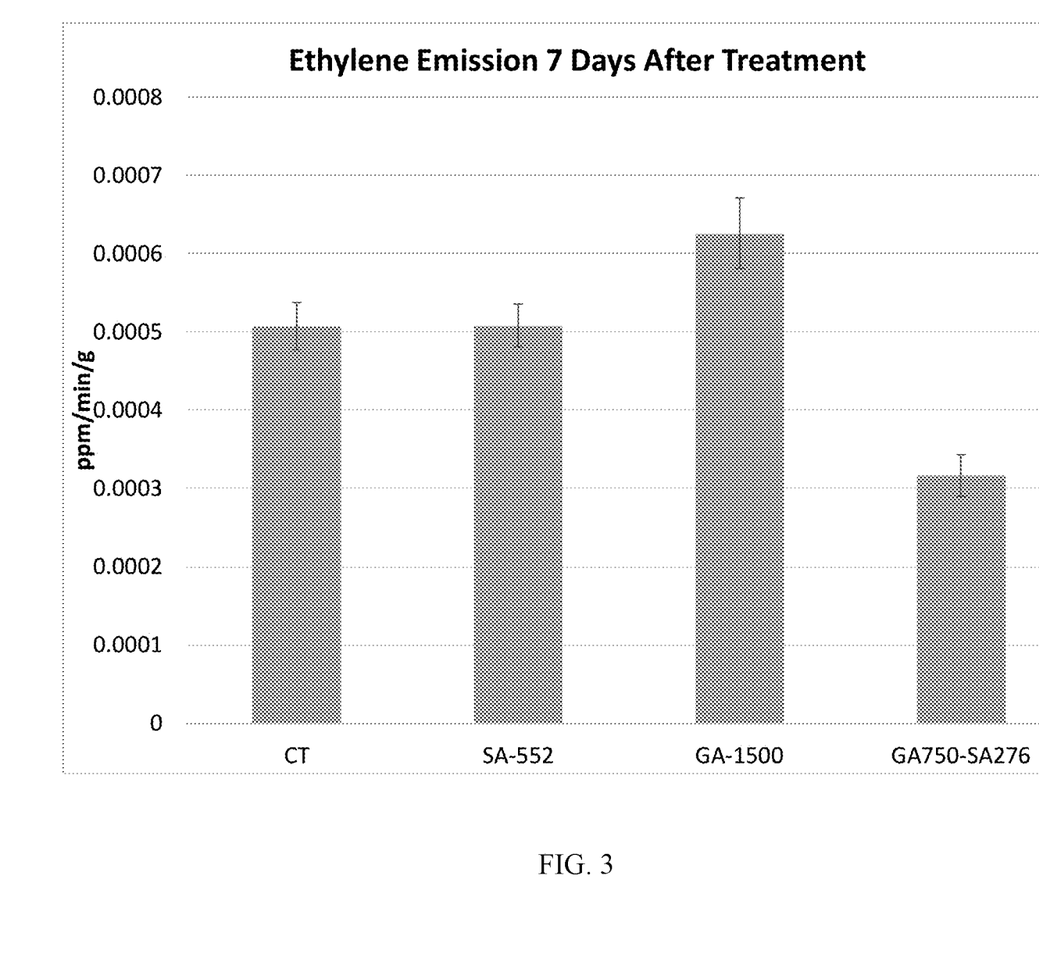
FIG. 3 is a graph showing the ethylene emission at 7 days after treatment with a control (CT), salicylic acid (SA) alone, gibberellic acid (GA) alone, and the GA+SA synergistic formulation of the present invention.
Figure 4:
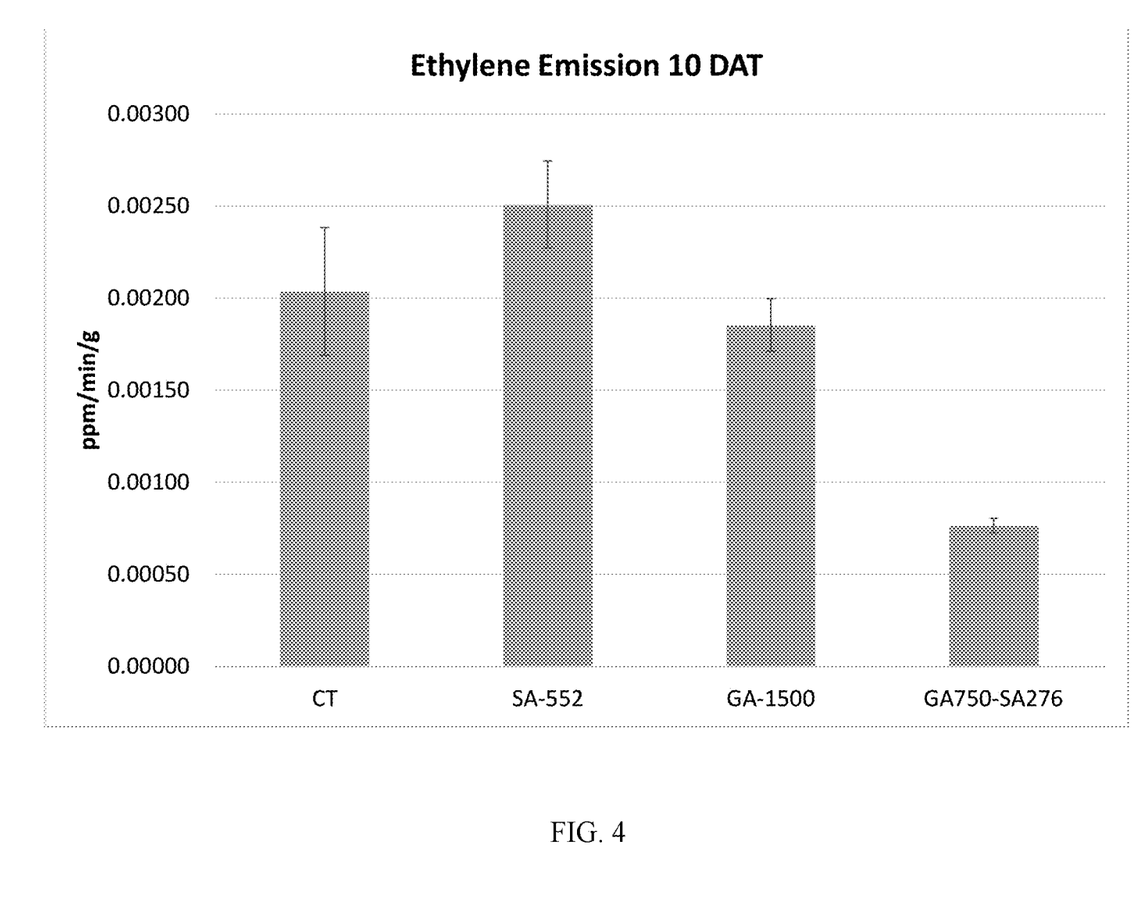
FIG. 4 is a graph showing the ethylene emission at 10 days after treatment with a control (CT), salicylic acid (SA) alone, gibberellic acid (GA) alone, and the GA+SA synergistic formulation of the present invention.
Figure 5:
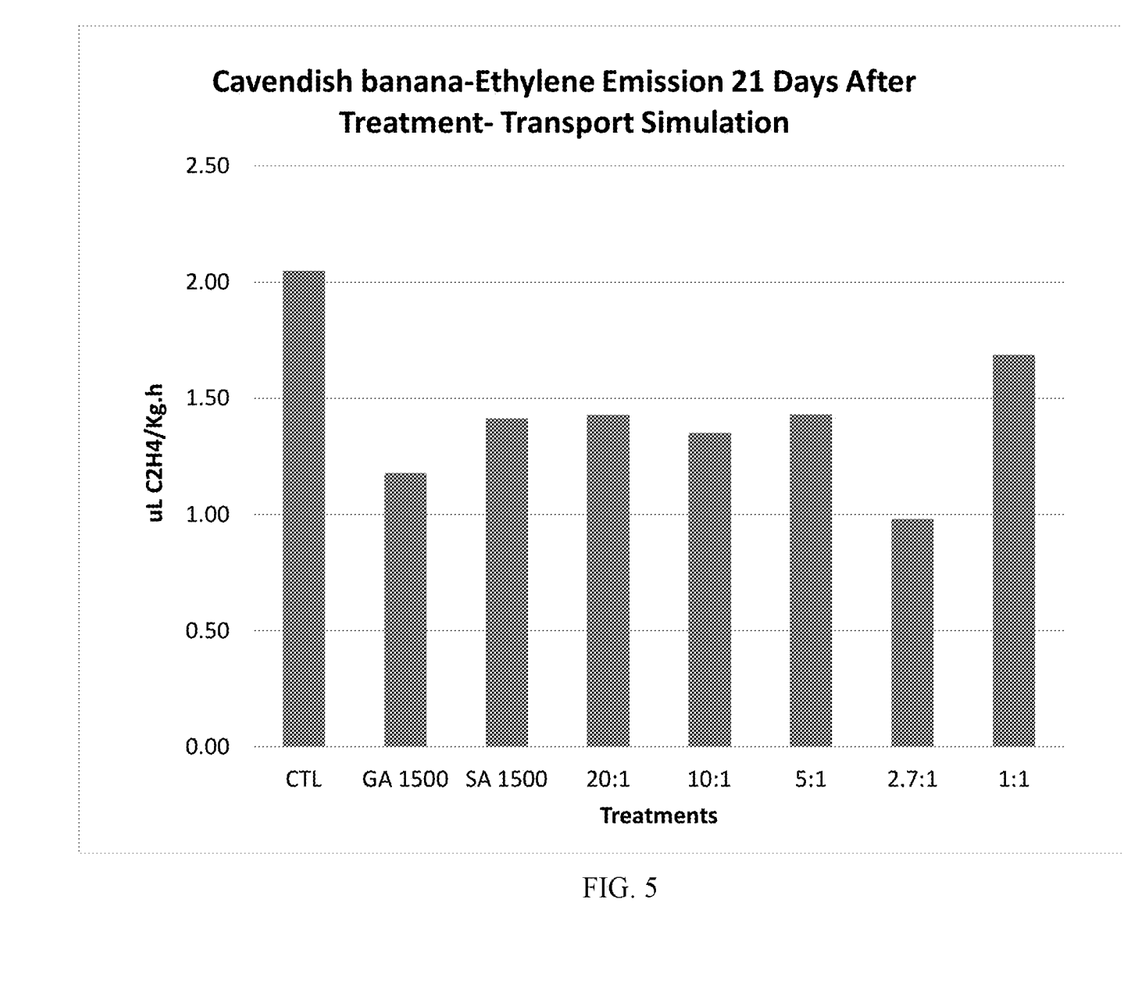
FIG. 5 is a graph showing the ethylene emission in Cavendish bananas at 21 days after treatment, this simulates the overseas transport at 13.5° C. The banana fruits were subjected to a control (CT), gibberellic acid (GA) alone, salicylic acid (SA) alone and the GA+SA synergistic formulation of the present invention.
Figure 6:
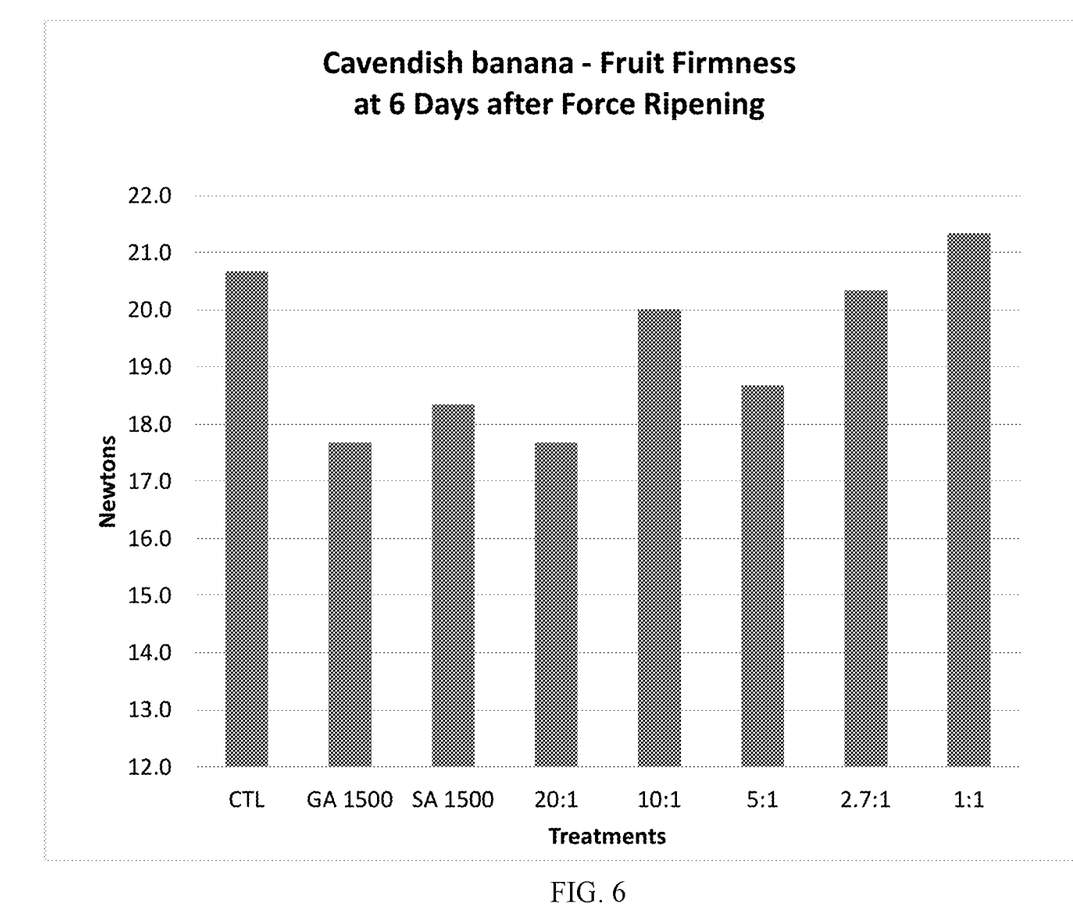
FIG. 6 is a graph showing the fruit firmness of Cavendish bananas 6 days after force ripening (treated with 100 ppm of ethylene simulating commercial handling of bananas). The bananas were subjected to a control (CT), gibberellic acid (GA) alone, salicylic acid (SA) alone and the GA+SA synergistic formulation of the present invention.
Figure 7:
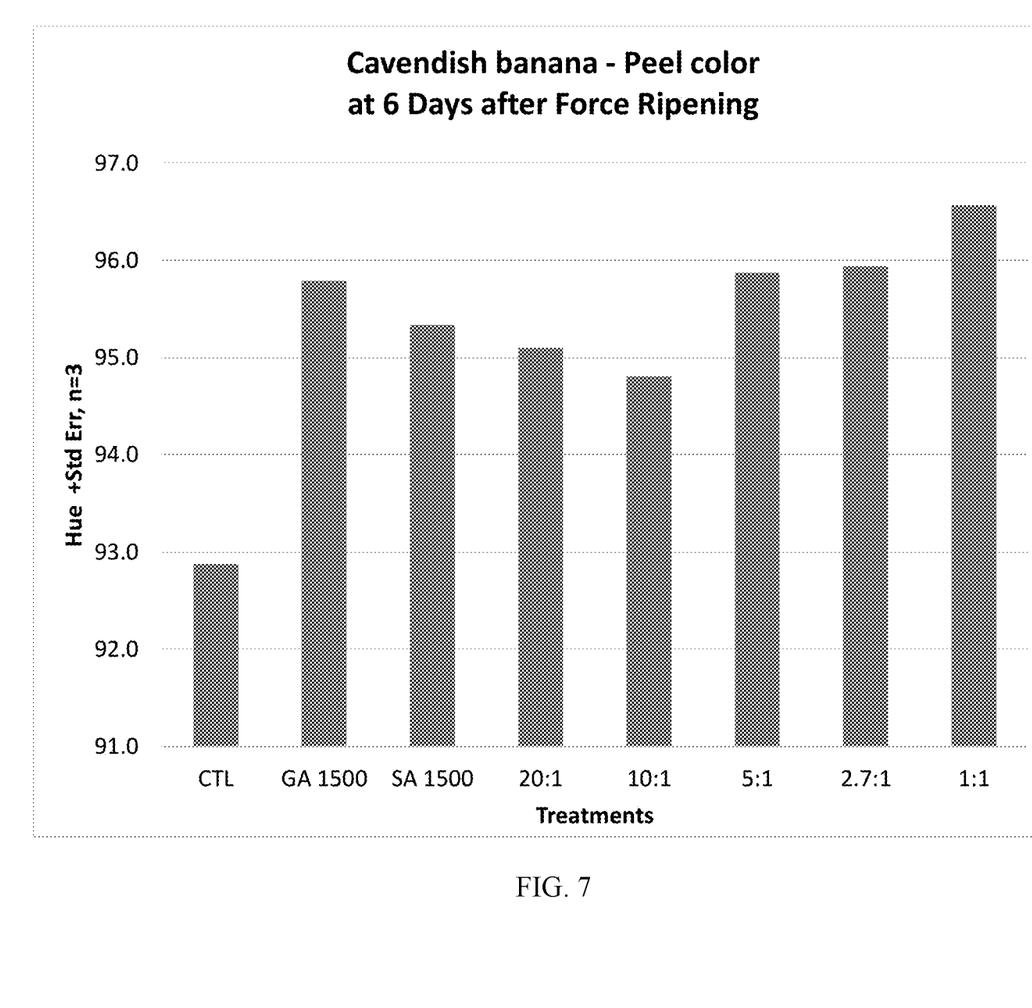
FIG. 7 is a graph showing the peel color of Cavendish bananas 6 days after force ripening (treated with 100 ppm of ethylene simulating commercial handling of bananas). The bananas were subjected to a control (CT), gibberellic acid (GA) alone, salicylic acid (SA) alone and the GA+SA synergistic formulation of the present invention.

FIGS. 5-7 show the test results indicating that ethylene emission right after transport simulation, when the bananas are still green, was the lowest when the synergistic formulation of 2.7:1 was applied to the bananas. The fruit firmness and color were measured on bananas that were exposed to ethylene to induce ripening (force ripening using 100-150 ppm of ethylene), this will show how effective was the postharvest treatment on banana shelf life. The Hue value for the control is the lowest and all treated bananas have a higher Hue value. The yellow color is equivalent to a Hue value of 90 and green color is equivalent to a Hue value of 180. The higher the hue the greener the banana peel.

Although the present invention has been disclosed in terms of a preferred embodiment, it will be understood that numerous additional modifications and variations could be made thereto without departing from the scope of the invention as defined by the following claims:

We claim:

1. A method for reducing ethylene production in bananas comprising:
   applying a synergistic formulation comprising,
   at least one gibberellin (GA) compound;
   at least 0.00625 wt. % salicylic acid (SA);
   ≥50 wt. % at least one organic solvent;
   less than 5 wt. % water;
   optionally at least one non-ionic or anionic surfactant; and
   optionally at least one adjuvant,
   wherein said formulation includes more GA than SA based on the total weight of the formulation, to said bananas to reduce ethylene production while maintaining firmness.

2. The method of claim 1 wherein the formulation comprises,
   up to 20 wt. % of said at least one gibberellin (GA) compound, and
   0.00625 to 19 wt. % salicylic acid (SA).

3. The method of claim 1 wherein the formulation comprises,
   18-20 wt. % of said at least one gibberellin (GA) compound; and 50-62 wt. % of said at least one organic solvent based on the total weight of the formulation.

4. The method of claim 1 wherein the formulation comprises,
   5-18.2 wt. % of said at least one gibberellin (GA) compound; 0.9-5 salicylic acid (SA); and 75-84 wt. % of said at least one organic solvent based on the total weight of the formulation.

5. The method of claim 1 wherein the formulation comprises,
   18-20 wt. % of said at least one gibberellin (GA) compound; 0.5-1 wt. % salicylic acid (SA); and 75-81.5 wt. % of said at least one organic solvent based on the total weight of the formulation.

6. The method of claim 1 wherein the formulation comprises,
   about 12 wt. % of said at least one gibberellin (GA) compound; about 4.5 wt. % salicylic acid (SA); and 80-83 wt. % of said at least one organic solvent based on the total weight of the formulation.

7. The method of claim 1 wherein said at least one gibberellin compound and said salicylic acid are the only active agents in said formulation.

8. The method of claim 1 wherein no halogenated compounds are present in said formulation.

9. The method of claim 8 wherein no $CaCl_2$ is present in said formulation.

10. The method of claim 1 wherein said at least one gibberellin compound is selected from the group consisting of gibberellic acid ("$GA_3$"), gibberellin$_4$ ("$GA_4$"), gibberellin$_{4/7}$ ("$GA_{4/7}$"), and combinations thereof.

11. The method of claim 10 wherein said gibberellin compound is gibberellic acid ("$GA_3$").

12. The method of claim 1 wherein said at least one organic solvent is selected from the group consisting of alcohols, dialkyl ketones, alkylene carbonates, alkyl esters, pyrrolidones, aryl esters, and combinations thereof.

13. The method of claim 1 wherein said at least one organic solvent is selected from the group consisting of ethanol, n-propanol, iso-propanol, ethyl lactate, 3-hydroxybutyrate (ethyl and propyl esters), polymeric and non-polymeric glycols, glycerols, polyethylene glycol, polypropylene glycol, propylene carbonate and combinations thereof.

14. The method of claim 1 wherein said at least one organic solvent is propylene glycol.

15. The method of claim 1 wherein said at least one organic solvent is at least one polyethylene glycol (PEG) with a molecular weight from 190-420.

16. The method of claim 1 wherein the formulation comprises ≤10 wt. % of said at least one non-ionic or anionic surfactants based on the total weight of the formulation.

17. The method of claim 1 wherein the formulation comprises less than 10 wt. % of said at least one adjuvant based on the total weight of the synergistic formulation.

* * * * *